United States Patent [19]

Ohno

[11] Patent Number: 5,319,756
[45] Date of Patent: Jun. 7, 1994

[54] INFORMATION PROCESSING SYSTEM CAPABLE OF HANDLING AN INCREASED NUMBER OF BRANCH CONDITIONS WITHOUT AN INCREASE OF MEMORY CAPACITY OF A CONTROL MEMORY

[75] Inventor: Seishirou Ohno, Yamanashi, Japan

[73] Assignee: NEC Corporation, Tokyo, Japan

[21] Appl. No.: 680,397

[22] Filed: Apr. 4, 1991

[30] Foreign Application Priority Data

Apr. 4, 1990 [JP] Japan ................................. 2-89638

[51] Int. Cl.[5] .......................... G06F 9/22; G06F 9/28; G06F 9/30; G06F 9/32
[52] U.S. Cl. ................................. 395/375; 395/775; 395/800; 364/DIG. 1
[58] Field of Search ..................................... 395/375

[56] References Cited

U.S. PATENT DOCUMENTS

| | | | |
|---|---|---|---|
| 3,967,104 | 6/1976 | Brantingham et al. | 364/709.09 |
| 4,338,661 | 5/1979 | Tredennick et al. | 395/375 |
| 4,471,433 | 10/1984 | Matsumoto et al. | 395/375 |
| 4,907,192 | 3/1990 | Kaneko | 395/375 |
| 4,974,155 | 11/1990 | Dulong et al. | 395/375 |
| 5,193,157 | 3/1993 | Barbour et al. | 395/375 |

Primary Examiner—Parshotam S. Lall
Assistant Examiner—Brian Ledell
Attorney, Agent, or Firm—Foley & Lardner

[57] ABSTRACT

In an information processing system operable in response to a branch condition signal which is representative of branch conditions and which is divisible into first and second groups produced a first and second output groups, a preliminary branch selection circuit selects either one of the first and the second output groups in response to a predetermined signal as a selected output group. A specific one of the branch conditions is selected from the selected output group by a first selection switch in response to a branch condition selecting signal produced from a microinstruction read out of a control memory. A specific branch condition is used to carry out a branch operation. The predetermined signal may be produced by an internal hardware of the information system, a specific microinstruction, specific program instructions, or a combination of a specific program instruction and a specific microinstruction.

8 Claims, 5 Drawing Sheets

INFORMATION PROCESSING SYSTEM CAPABLE OF HANDLING AN INCREASED NUMBER OF BRANCH CONDITIONS WITHOUT AN INCREASE OF MEMORY CAPACITY OF A CONTROL MEMORY

BACKGROUND OF THE INVENTION

This invention relates to an information processing system which is capable of processing each instruction by the use of a microprogram and which is capable of judging a branch condition in the microprogram.

In a conventional information processing system of the type described, each program instruction or macroinstruction in a program is very often processed by the use of a plurality of microinstructions which are memorized in a control memory having a plurality of addresses. It is well known that branch microinstructions are included in such microinstructions so as to determine branch conditions. For this purpose, each of the branch microinstructions includes a branch condition selection area or field composed of a predetermined number of bits which will be called branch condition bits. Such branch condition bits are used as a zero detection signal representative of zero detection of a calculation result, a sign bit signal, a carry signal, an overflow signal, a wide variety of flags, and a mode signal indicative of various modes. Under the circumstances, the branch condition selection area in each branch microinstruction should have a bit number determined by the number of the branch conditions. Accordingly, the bit number of the branch condition selection area increases with an increase of the number of the branch conditions. This results in an increase of a memory capacity of the control memory. Thus, an amount of hardware must be inevitably increased with an increase of the branch conditions.

SUMMARY OF THE INVENTION

It is an object of this invention to provide an information processing system which is capable of increasing the number of branch conditions without an increase in the amount of hardware.

It is a specific object of this invention to provide an information processing system of the type described, which can cope with an increase of the branch conditions without an increase of a memory capacity of a control memory.

An information processing system according to this invention operable in response to a branch condition signal representative of a plurality of branch conditions which are divided into a first group of the branch conditions and a second group of the branch conditions distinguished from the first group. According to this invention, the information processing system comprises storage means for storing the branch condition signal to individually produce first and second output groups of the branch conditions corresponding to the said first and said second groups, respectively, selection signal producing means for producing a selection signal representative of selecting the first and the second output groups, selecting means connected to the storage means and the selection signal producing means for selecting a selected one of the first and the second output groups in response to the selection signal, and branch means connected to the selecting means for carrying out a branch operation by the use of either one of the branch conditions indicated by the selected one of the first and the second output groups.

DESCRIPTION OF THE PREFERRED EMBODIMENTS

Figure 1:
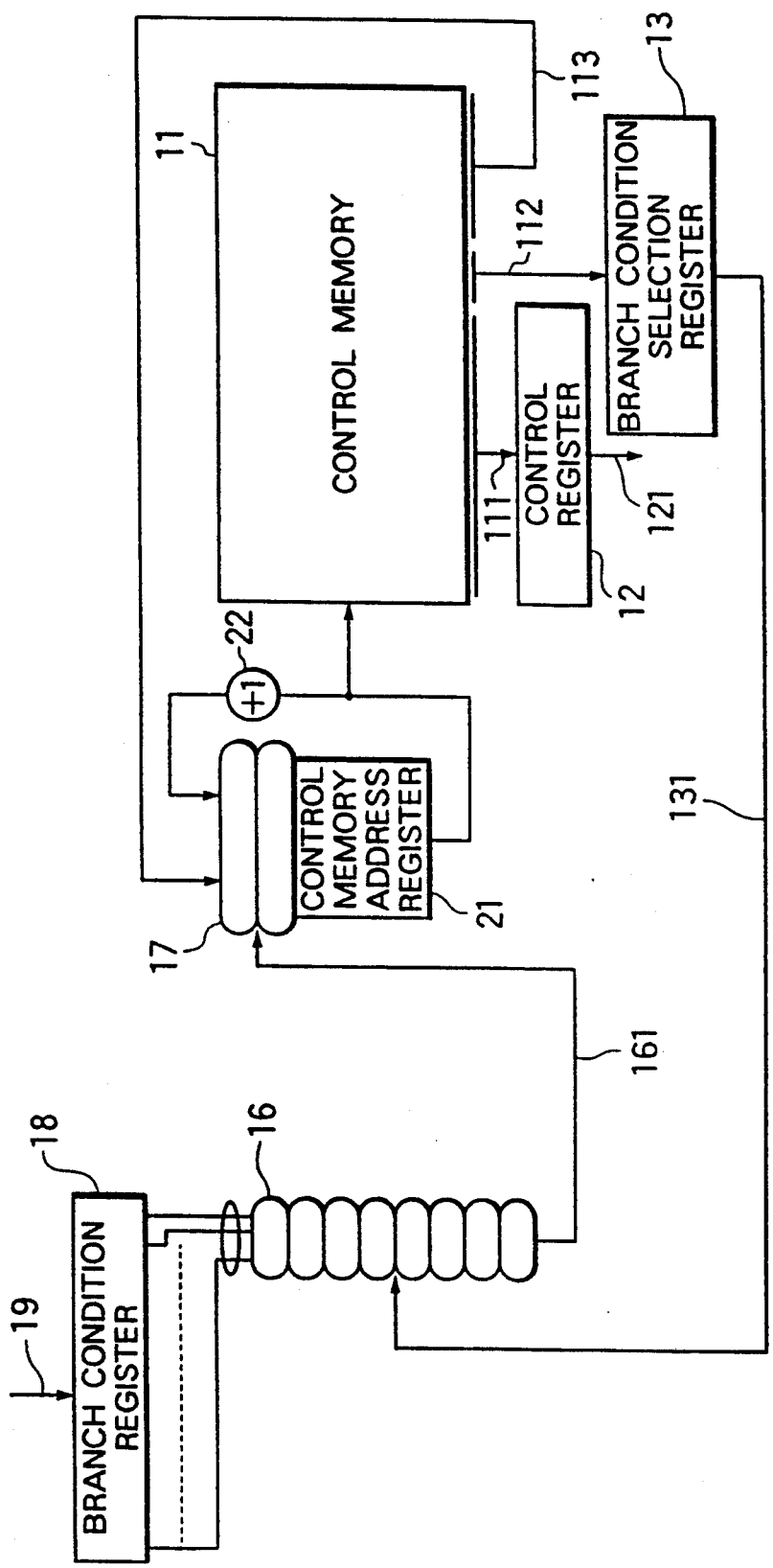
FIG. 1 is a block diagram of a conventional information processing system which is capable of processing branch microinstructions.

Referring to FIG. 1, a conventional information processing system comprises a control memory 11 which has a plurality of addresses and which memorizes a plurality of microinstructions in the addresses. Such microinstructions serve to process program instructions or macroinstructions and include branch microinstructions which bear branch conditions. Each branch microinstruction has a control information field, a branch condition selection field, and a branch destination address field, which are for arranging a control information signal 111 for the information processing system, a branch condition selecting signal 112 of a predetermined number of bits, and an address signal 113 representative of a branch destination address of a destination microinstruction, respectively. The address signal 113 may be referred to as a branch destination address signal. In the example being illustrated, the predetermined number is assumed to be equal to three.

The control information signal 111 is sent to a control register 12 to be delivered to various portions (not shown) of the information processing system through a signal line 121. The branch condition selecting signal 112 is sent to a branch condition selection register 13 to be held therein and to be thereafter delivered as an output branch selection signal 131 to a first switching circuit 16. The illustrated branch condition selecting signal 112 is composed of three bits. In this connection, the output branch selection signal 131 is composed of three bits, like the branch condition selecting signal 112, and can therefore specify eight different states or conditions.

On the other hand, the address signal 113 indicates the branch destination address and is sent to a second switching circuit 17.

In FIG. 1, the first switching circuit 16 is connected to a branch condition register 18 which is supplied from a hardware circuit (not shown) with the branch condition signals through a signal line 19. With this structure, each of the branch condition signals is delivered as an output branch condition signal to the first switching circuit 16 which may be called a branch condition selection circuit and which is given the output branch selection signal 131 through the branch condition selection register 13.

Herein, it is to be noted that the output branch selection signal 131 is produced in conjunction with a previous one of the microinstructions that precedes a current one of the microinstructions issued from the control memory 11. Either one of the branch condition signals is selected by the first switching circuit 16 as a selected branch condition signal 161 in response to the output branch selection signal 131.

The first switching circuit 16 is operable to select a single one of the output branch condition signals in response to the output branch selection signal 131. In the example being illustrated, the output branch condition signals serve to specify branch conditions, namely, branch judgment conditions, such as a zero detection signal, a signal bit signal, a carry signal, an overflow detection signal, various kinds of flags, and mode signals, and the like, as mentioned in the preamble of the instant specification. At any rate, the illustrated output branch condition signals specify eight kinds of branch conditions. A selected one of the branch condition signals is selected as a selected branch condition in response to the output branch selection signal 131 of three bits and is depicted at 161. In other words, the branch conditions are judged by the first switching circuit 16.

The selected branch condition signal 161 is sent to the second switching circuit 17 which is connected to a control memory address register 21. The control memory address register 21 stores a current memory address which is used to access the control memory 11 and to read the current microinstruction out of the control memory 11. The current memory address and unity are summed up by an adder 22 to calculate a sum between them which indicates a subsequent memory address. The subsequent memory address is sent as a subsequent address signal to the second switching circuit 17 together with the branch destination address signal 113. Either one of the subsequent address signal and the branch destination address signal 113 is selected as a following address signal by the second switching circuit 17 in accordance with the selected branch condition signal that is sent from the first switching circuit 16. The following address signal is delivered to both the control memory 11 and the adder 22 and is thereafter processed in a like manner.

As mentioned before, the branch condition signals stored in the branch condition register 18 are selected by the output branch selection signal 131 produced from the branch condition selecting signal 112 in the branch condition field of each microinstruction. This shows that the number of the branch conditions to be selected are determined by the bit number of the branch condition selecting signal 112, namely, the branch condition field. Accordingly, the bit number of the branch condition selecting signal 112 should be increased so as to increase the number of the branch conditions to be selected. As a result, the illustrated information processing system is disadvantageous as pointed out in the preamble of the instant specification.

Figures 2, 3:
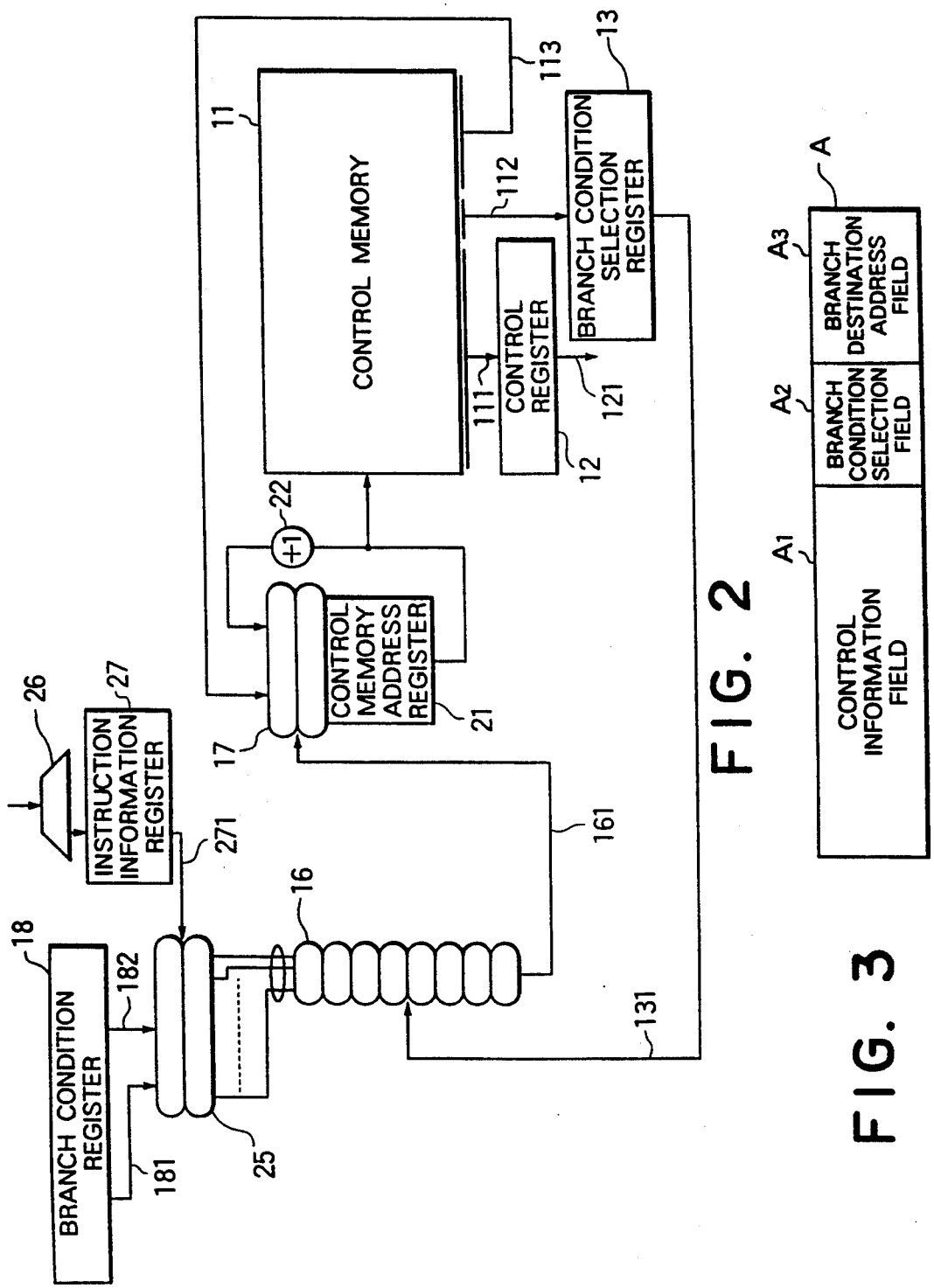
FIG. 2 is a block diagram of an information processing system according to a first embodiment of this invention.
FIG. 3 is a format of a microinstruction used in the information processing system illustrated in FIG. 2.

Referring to FIGS. 2 and 3, an information processing system according to a first embodiment of this invention is similar in structure and operation to that illustrated in FIG. 1 except that a preliminary branch selection circuit 25, an instruction decoder 26, and an instruction information register 27 are included in the information processing system illustrated in FIG. 2.

The control memory 11 illustrated in FIG. 2 produces each microinstruction A (as shown in FIG. 3) in response to a current memory address sent from the control memory address register 21. The microinstruction has a control information field A1, a branch condition selection field A2, and a branch destination address field A3, as mentioned in conjunction with FIG. 1. As mentioned in conjunction with FIG. 1, the control information field A1 is for arranging the control information signal 111 for controlling the information processing system while the branch condition selection field A2 is for arranging the branch condition selecting signal 112 of three bits. In addition, the branch destination address field A3 is for arranging the branch destination address signal representative of the branch destination address of the destination microinstruction. The control information signal 111, the branch condition selecting signal 112, and the branch destination address signal 113 are delivered to the control register 12, the branch condition selection register 13, and the second switching circuit 17, respectively, as already described with reference to FIG. 1.

In FIG. 2, the illustrated branch condition register 18 is loaded with a branch condition signal of sixteen bits from a hardware circuit (not shown) of the information processing system in a manner similar to that illustrated in FIG. 1. It is assumed that the illustrated branch condition signal can specify sixteen branch conditions. The branch condition signal of sixteen bits is divided into a first group of eight bits and a second group of eight bits distinguished from the first group. In the illustrated example, the first group may be arranged in higher significant bits of the sixteen bits while the second group may be arranged in lower significant bits thereof. For example, the first group may include, as one of the branch condition signals, a flag representative of a calculation result of zero while the second group may include, as another one of the branch condition signals, another flag representative of a positive calculation result.

The first and the second groups are stored in the branch condition register 18 and are thereafter individually sent as first and second output groups 181 and 182 to the preliminary branch selection circuit 25. As illustrated in FIG. 2, the preliminary branch selection circuit 25 may be called a preliminary switching circuit and is located between the branch condition register 18 and the first switching circuit 16. The preliminary branch selection circuit 25 is controlled by a combination of the instruction decoder 26 and the instruction information register 27. The instruction decoder 26 is given a current program instruction or a current macroinstruction from another hardware circuit (not shown) to judge whether or not the current program instruction is a predetermined instruction and to produce a judgment signal 271 representative of a result of judgment. Herein, it is assumed that the judgment signal 271 is composed of a single bit and takes a logic "1" level on reception of the predetermined instruction. In the example, when the judgment signal takes the logic "1" level, the first output group 181 is selected by the preliminary branch selection circuit 25 to be sent to the first switching circuit 16. Otherwise, the second output group 182 is selected by the preliminary branch selection circuit 25 to be sent to the first switching circuit 16. At any rate, the judgment signal 271 serves to select either one of the first and the second output groups 181 and 182 and may be referred to as a selection signal.

In this connection, a combination of the instruction decoder 26 and the instruction information register 27 will be collectively called a selection signal producing circuit for selecting either one of the first and the second output groups as a selected output group of the branch conditions in response to the selection signal.

Thus, the first switching circuit 16 is selectively supplied with the first and the second output groups 181 and 182 together with the output branch selection signal 131 sent from the branch condition selection register 13. The first switching circuit 16 may be similar to that illustrated in FIG. 1 in spite of the fact that each branch condition signal is composed of sixteen bits which are equal to twice the eight bits of the branch condition signal mentioned in conjunction with FIG. 1. This is because the selected output group is composed of eight bits like the branch condition signal held in the branch condition register 18 illustrated in FIG. 1.

Responsive to the output branch selection signal 131, the first switching circuit 16 selects one of the branch conditions indicated by the selected output group in a manner similar to that shown in FIG. 1 and supplies a selected branch condition signal 161 to the second switching circuit 17. Thus, the selected output group of eight bits can be selected by the use of the output branch selection signal 131 of three bits. This shows that each branch condition of sixteen bits is equivalently selected by the output branch selection signal 131 of three bits.

The second switching circuit 17 selects, as a selected address signal, either one of the branch destination address signal 113 and the subsequent address signal in the manner described with reference to FIG. 1. The selected address signal is held in the control memory address register 21 as a following memory address to be substituted for the current memory address. At any rate, a combination of the first switching circuit 16, the second switching circuit 17, the control memory address register 21, and the adder 22 is operable to determine or judge the branch destination address of the following microinstruction in accordance with the selected output group of the branch conditions. This means that the branch conditions are judged by the combination of the first switching circuit 16, the second switching circuit 17, the control memory address register 21, and the adder 22.

Herein, let flags X and Y be set up when a calculation result is equal to zero and is negative, respectively. The flags X and Y are assumed to belong to the first and the second groups, respectively. In addition, it is also assumed that the instruction decoder 26 decodes an instruction In1 which indicates a branch when the calculation result is equal to zero. On decoding such an instruction In1 in the instruction decoder 26, the instruction information register 27 supplies the logic "1" level to the preliminary branch selection circuit 25 as the judgment signal 271. As a result, the preliminary branch selection circuit 25 selects the flag X as the selected output group. The first switching circuit 16 and the control memory address register 21 carry out a branch operation in connection with the instruction In1 on the basis of a value of the flag X.

On the other hand, let the instruction decoder 26 decode an instruction In2 such that a branch is indicated when a calculation result is negative. In this case, the preliminary branch selection circuit 25 selects the flag Y in response to the judgment signal 271 sent from the instruction information register 27. The first switching circuit 16 and the control memory address register 21 carry out a branch operation or judges the branch conditions on the basis of a value of the flag Y.

Figure 4:
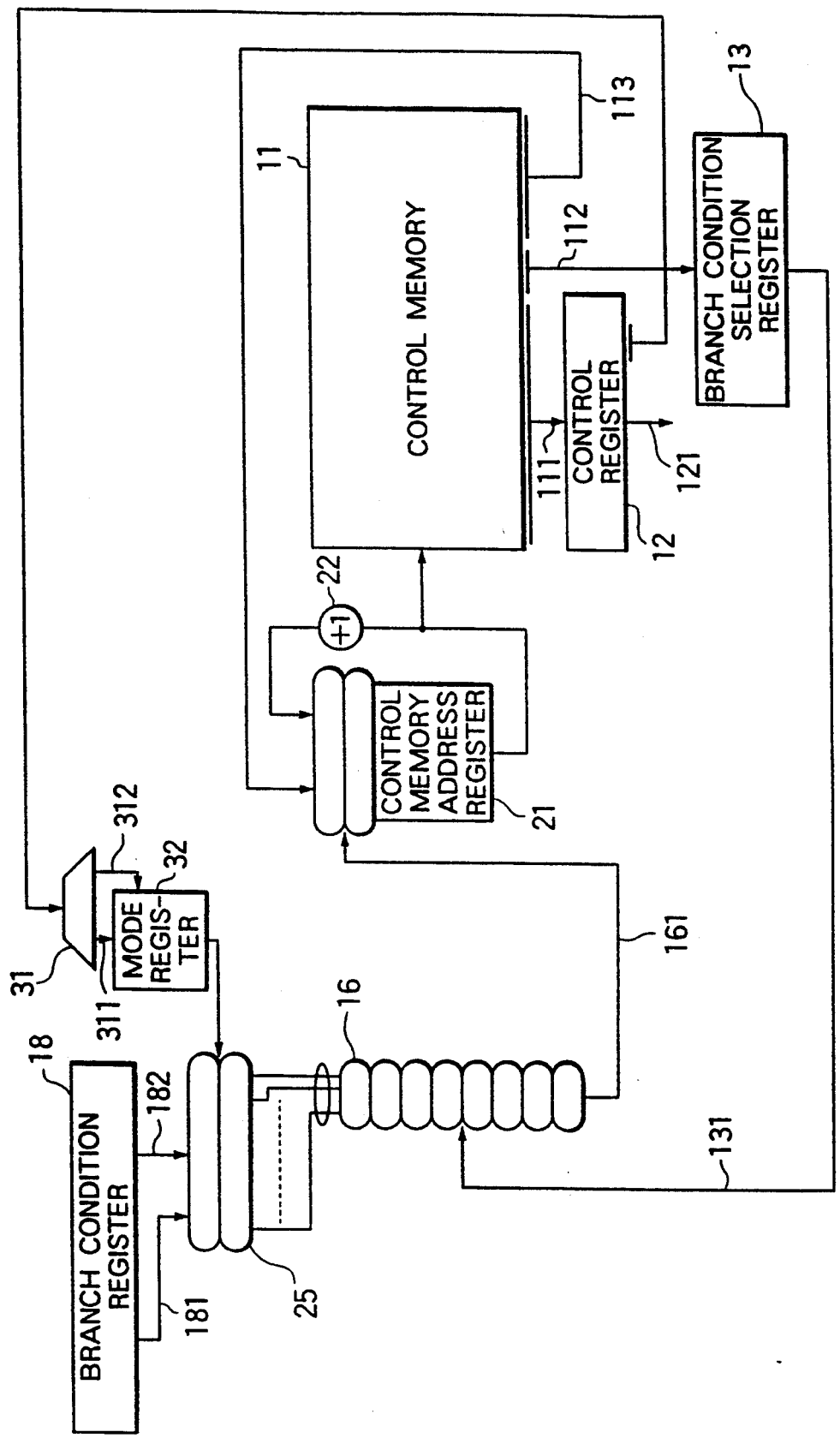
FIG. 4 is a block diagram of an information processing system according to a second embodiment of this invention.

Referring to FIG. 4, an information processing system according to a second embodiment of this invention is similar in structure and operation to that illustrated in FIG. 2 except that a microinstruction decoder 31 and a mode register 32 are substituted for the instruction decoder 26 and the instruction information register 27 illustrated in FIG. 2. As illustrated in FIG. 4, the microinstruction decoder 31 is connected to that part of the control register 12 which indicates a specific mode. It is assumed that such a specific mode is indicated by a first specific microinstruction and is reset by a second specific microinstruction. In this case, the microinstruction decoder 31 produces a set signal 311 and a reset signal 312 when the first and the second specific microinstructions are decoded, respectively.

As in FIG. 2, the branch condition register 18 is loaded with each branch condition signal of sixteen bits which is divisible into a first group of eight higher significant bits and a second group of eight lower significant bits. The first and the second groups of each branch condition signal are individually sent to the preliminary branch selection circuit 25.

It is assumed that the first specific microinstruction is produced by the control memory 11 and that a part of the first specific microinstruction is decoded by the microinstruction decoder 31 into the set signal 311. Consequently, the logic "1" level is set into the mode register 32 and is sent to the preliminary branch condition selection circuit 25. Supplied with the logic "1" level, the preliminary branch selection circuit 25 selects either one of the first and the second output groups of each branch condition signal held in the branch condition register 18.

On the other hand, when a part of the second specific microinstruction is decoded by the microinstruction decoder 31, the reset signal 312 is produced by the microinstruction decoder 31 to reset the mode register 32. As a result, the remaining one of the first and the second output groups of each branch condition signal is selected by the preliminary branch selection circuit 25.

From this fact, it is readily understood that the first and the second specific microinstructions are included in the microprogram. With this structure, it is possible that all of the branch conditions held in the branch condition register 18 can be used to judge a branch operation in the microprogram in response to each program instruction. In other words, branch judgment conditions can be changed by the microprogram. This makes it possible to change or modify the branch conditions in each program instruction from one to another by the use of the microprogram and to consequently widen uses of the microprogram.

Figure 5:
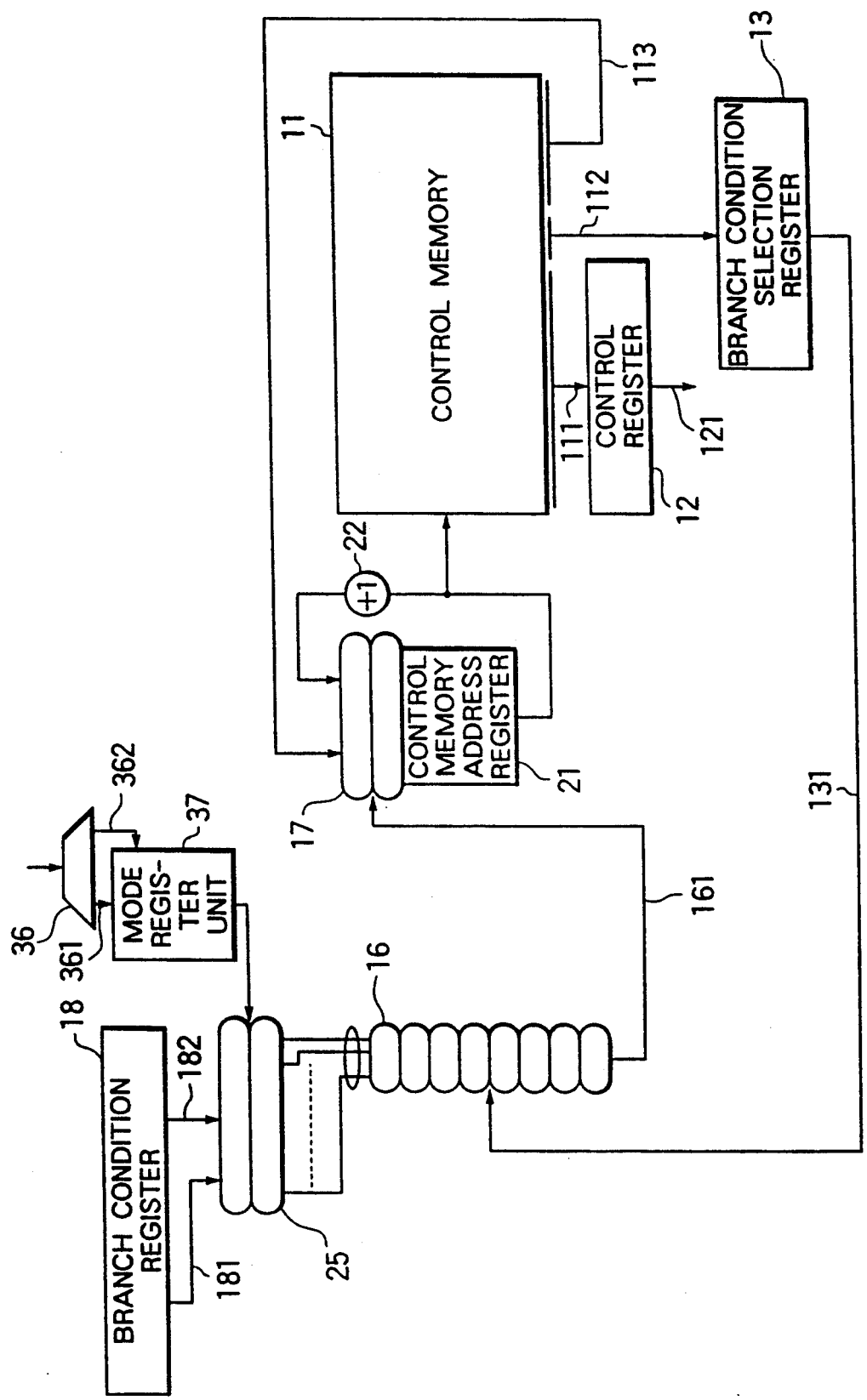
FIG. 5 is a similar block diagram of an information processing system according to a third embodiment of this invention.

Referring to FIG. 5, an information processing system according to a third embodiment of this invention is similar to that illustrated in FIG. 4 except that an instruction decoding unit 36 and a mode register unit 37 are substituted for the instruction decoder 31 and the mode register 32. It is to be noted that the instruction decoding unit 36 is not connected to the control register 12 but is supplied with each program instruction from a hardware circuit (not shown). The illustrated instruction decoding unit 36 supplies the mode register unit 37 with a set signal and a reset signal in response to first and second specific instructions, respectively.

More specifically, when the first specific instruction is decoded by the instruction decoding unit 36, the set signal 361 is supplied from the instruction decoding unit 36 to the mode register unit 37. The resultant mode register unit 37 is put into a set state to deliver the logic "1" level to the preliminary branch selection circuit 25. Supplied with the logic "1" level, the preliminary branch selection circuit 25 selects either one of the first and the second output groups of each branch condition signal held in the branch condition register 18.

On the other hand, when the second specific instruction is decoded by the instruction decoding unit 36, the reset signal 362 is supplied to the mode register unit 37 to put the same into a reset state. In the reset state, the preliminary branch selection circuit 25 selects a remaining one of the first and the second output groups of each branch condition signal held in the branch condition register 18.

With this structure, the mode register unit 37 continuously holds the logic "1" level until the second specific instruction is executed by the information processing unit after execution of the first specific instruction. While the logic "1" level is kept in the mode register unit 37, it is possible to judge a branch operation in a microprogram memorized in the control memory 11, under the same branch judgment condition.

In addition, inasmuch as the mode register unit 37 is kept at the logic "1" level during a time interval between execution of the first specific instruction and execution of the second specific instruction, selection of the branch judgment condition does not depend on any program instruction that is being executed in the information processing system.

Figure 6:
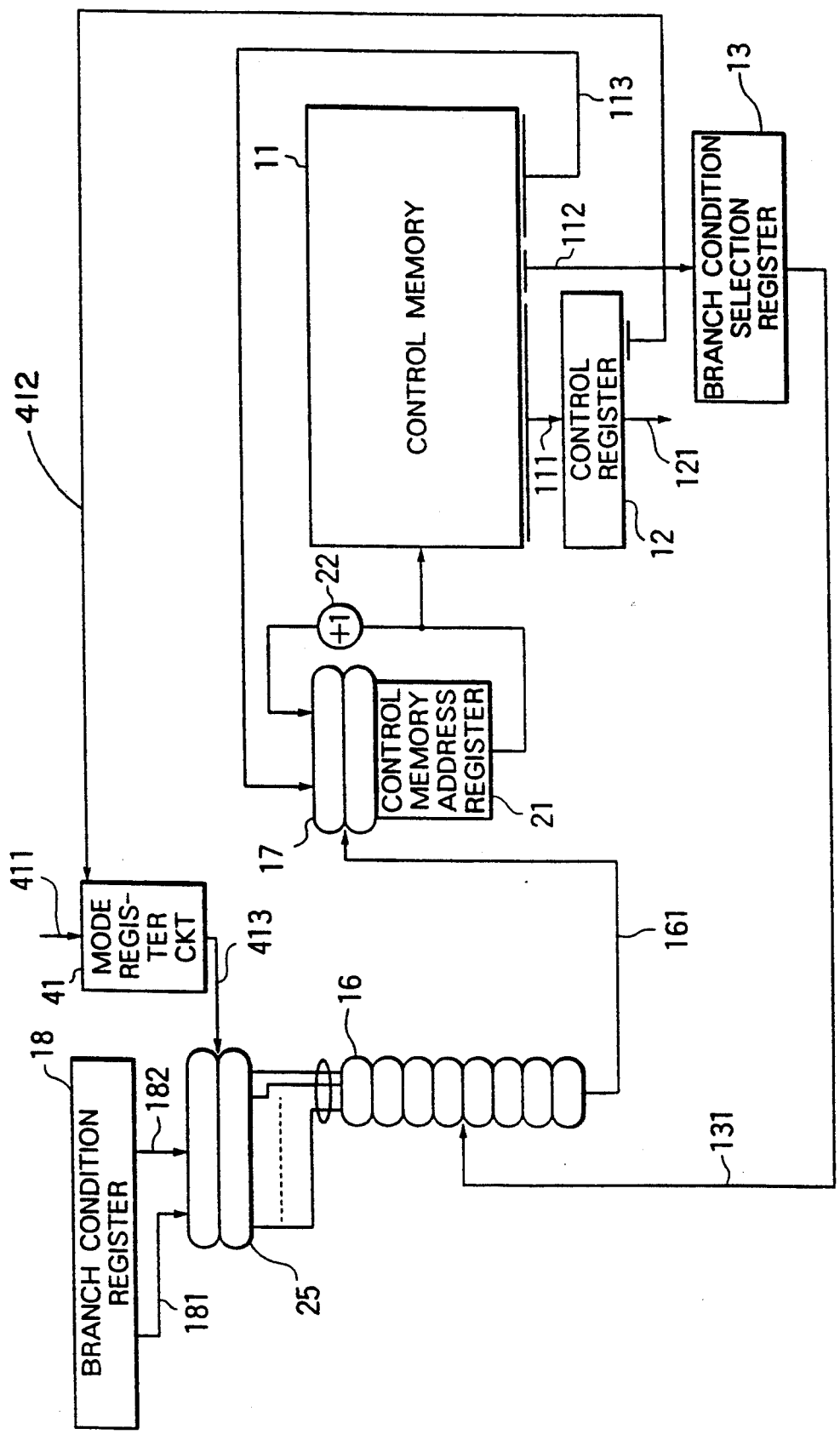
FIG. 6 is a similar block diagram of an information processing system according to a fourth embodiment of this invention.

Referring to FIG. 6, an information processing system according to a fourth embodiment of this invention is similar in structure to that illustrated in FIG. 5 except that a mode register circuit 41 is included instead of the mode register unit 37 and the instruction decoding unit 36. The illustrated mode register circuit 41 is put into a set state in response to an interruption signal 411 sent from an external circuit (not shown) connected outside of the information processing system. Moreover, the mode register circuit 41 is connected to a part of the control register 12 to be put into a reset state when a particular microinstruction is read out of the control memory 11 and is given to the mode register circuit 41 as a reset signal 412. This shows that the mode register circuit 41 is kept at the set state during a time interval between reception of the interruption signal 411 and execution of the particular microinstruction 412. As a result, the mode register circuit 41 produces the logic "1" level during the above-mentioned time interval. This makes it possible to judge a branch operation in the microprogram by the use of a branch judgment condition which is only used on interruption.

In any event, it is possible to initially reduce the branch conditions specified by sixteen bits into reduced branch conditions specified by eight bits by the use of the preliminary branch selection circuit 25 in response to a predetermined signal produced in various manners as mentioned in conjunction with FIGS. 2, 4, 5, and 6. Subsequently, a branch judgment is carried out by using one bit selected from the reduced branch conditions.

With this structure, a single branch condition, namely, a single branch judgment condition can be finally selected from various kinds of branch judgment conditions even when the control memory 11 has a memory capacity which is equal to that used in the conventional information processing system illustrated in FIG. 1.

Therefore, the number of the branch judgment conditions to be selected can be increased without an amount of hardware in the information processing system. Alternatively, it is possible to decrease a memory capacity of the control memory 11 when the number of the branch judgment conditions is equal to the number of the convention branch judgment conditions.

In the embodiments mentioned with reference to FIGS. 2, 4, 5, and 6, the branch judgment condition in question is determined by selecting one bit from sixteen bits. Namely, each branch judgment condition is assumed to be specified by a single bit. However, each branch judgment condition can be represented by a plurality of bits.

While this invention has thus far been described in conjunction with several embodiments thereof, it will be readily possible for those skilled in the art to put this invention into practice in various other manners. For example, the branch condition signal held in the branch condition register 18 may be divided into three or more groups.

What is claimed is:

1. An information processing system operable in response to a predetermined signal representative of a branch operation and a branch condition signal representative of a plurality of branch conditions which are divided into a first group of branch conditions and a second group of branch conditions distinguished from said first group of branch conditions, said information processing system comprising:

a control memory which has a plurality of addresses and memorizes, in said addresses, a plurality of branch microinstructions each of which has a branch condition selection field for producing a branch condition selection signal which selects a selected branch condition from among branch conditions of a selected one of said first and second groups;

storage means for storing said branch condition signal and for producing an output branch condition signal which is divided into first and second output groups corresponding to said first and said second groups, respectively;

selection signal producing means supplied with said predetermined signal for producing a selection signal which is determined by said predetermined signal and which indicates selection of one of said first and said second output groups of said output branch condition signal;

selecting means connected to said storage means and said selection signal producing means for selecting, in response to said selection signal, a selected one of said first and said second output groups that corresponds to said selected one of said first and second groups of said branch condition signal; and branch means connected to said selecting means and coupled to said control memory for carrying out a branch operation by selecting, in response to said branch condition selection signal, said selected branch condition of said selected one of said first and second output groups.

2. An information processing system as claimed in claim 1, wherein said selection signal producing means comprises:

detecting means for detecting said predetermined signal to produce a detection signal representative of reception of said predetermined signal; and signal producing means responsive to said detection signal for producing said selection signal.

3. An information processing system as claimed in claim 2, wherein said predetermined signal is produced on execution of a predetermined instruction which is being processed in said information processing system.

4. An information processing system as claimed in claim 2, wherein said predetermined signal is produced on execution of a specific microinstruction which is being executed in said information processing system.

5. An information processing system operable in response to a specific instruction and a branch condition signal, said specific instruction specifying a specific mode related to said branch condition signal while said branch condition signal is representative of a plurality of branch conditions which are divided into a first group of branch conditions and a second group of branch conditions distinguished from said first group of branch conditions, said information processing system comprising:
- a control memory which has a plurality of addresses and memorizes, in said addresses, a plurality of branch microinstructions each of which has a branch condition selection field for arranging a branch condition selection signal which selects a selected branch condition from among branch conditions of a selected one of said first and second groups;
- storage means for storing said branch condition signal to produce an output branch condition signal which is divided into first and second output groups corresponding to said first and said second groups, respectively;
- detecting means for detecting said specific instruction to produce a selection signal which is representative of selecting one of said first and said second output groups of said output branch conditions signal;
- selecting means connected to said storage means and said selection signal producing means, for selecting, in response to said selection signal, a selected one of said first and said second output groups that corresponds to said selected one of said first and second groups of said branch conditions signal; and
- branch means connected to said selecting means and coupled to said control memory for carrying out a branch operation by selecting, in response to said branch condition selection signal, said selected branch condition of said selected one of said first and second output groups.

6. An information processing system operable in response to a branch condition signal representative of a plurality of branch conditions which are divided into a first group of branch conditions and a second group of branch conditions distinguished from said first group of branch conditions, said information processing system comprising:
- a control memory which has a plurality of addresses and memorizes, in said addresses, a branch microinstruction and a specific microinstruction, said branch microinstruction producing a branch condition selection signal which selects a branch condition from among branch conditions of a selected one of said first and second groups while said specific microinstruction indicates a specific mode related to said branch condition signal;
- storage means for storing said branch condition signal to produce an output branch condition signal which is divided into first and second output groups corresponding to said first and said second groups, respectively;
- detecting means coupled to said control memory for detecting said specific microinstruction to produce a selection signal representative of said specific mode and to select a selected one of said first and said second output groups of said output branch condition signal;
- selecting means connected to said storage means and said detecting means for selecting said selected one of said first and second output groups in response to said selection signal; and
- branch means connected to said selecting means and coupled to said control memory for carrying out a branch operation by selecting said selected branch condition of said selected one of said first and second output groups in response to said branch condition selection signal.

7. An information processing system operable in response to a specific mode instruction and a branch condition signal, said specific mode instruction being representative of a specific mode related to said branch condition signal while said branch condition signal is representative of a plurality of branch conditions which are divided into a first group of branch conditions and a second group of branch conditions distinguished from said first group of branch conditions, said information processing system comprising:
- a control memory which has a plurality of addresses and memorizes, in said addresses, a branch microinstruction which produces a branch condition selection signal which selects a selected branch condition from among said branch conditions of a selected one of said first and second groups;
- storage means for storing said branch condition signal to produce an output branch condition signal which is divided into first and second output groups corresponding to said first and said second groups, respectively;
- detecting means supplied with said specific mode instruction for detecting said specific mode instruction to produce a selection signal representative of said specific mode and to select a selected one of said first and said second output groups of said output branch condition signal;
- selecting means connected to said storage means and said detecting means for selecting said selected one of said first and second output groups in response to said selection signal; and
- branch means connected to said selecting means and coupled to said control memory for carrying out a branch operation by selecting said selected branch condition of said selected one of said first and second output groups in response to said branch condition selection signal sent from said control memory.

8. An information processing system as claimed in claim 5, wherein said specific instruction is specified by one of an instruction indicative of selecting one of said first and second output groups of said output branch condition signal and by an instruction which is being processed in said information processing system and which indicates a predetermined operation in addition to said branch operation.

* * * * *